Patented Feb. 4, 1936

2,029,954

UNITED STATES PATENT OFFICE 2,029,954

MANUFACTURE OF SYNTHETIC RESINS OF THE AMINE-ALDEHYDE TYPE

Theodor Sutter, Basel, Switzerland, assignor to Society of Chemical Industry in Basle, Basel, Switzerland No Drawing. Application January 23, 1933, Serial No. 653,217. In Switzerland February 5, 1932

10 Claims. (Cl. 260—130)

The present invention relates to a process for making synthetic resins from methylene derivatives of aromatic amine-bases and aldehydes.

It is known that aromatic amines on condensation with formaldehyde yield quite different products depending on whether the condensation occurs without the intervention of acid or in an acid medium. The aldehyde always attacks primarily the nitrogen, generally with the formation of an azomethine group —N=CH$_2$. This primary condensation product, the anhydroformaldehydeaniline, always forms the main product when the aniline and formaldehyde are mixed in a neutral condition or in presence of an insufficient proportion of acid. On standing, the body, which at first has a low melting point, passes into the more sparingly soluble polymeric anhydroformaldehydeaniline which, in turn, passes into the soluble, fusible resin when considerably heated, if necessary in the presence of a small proportion of an acid or other addition.

According to Scheiber-Sändig "Die künstlichen Harze" (1929), page 98, the condensation occurs not by the formation of methylene bridges but probably by polymerization of the azomethine group. The resins are not suited for the manufacture of molded products but under certain conditions can be converted by further application of aldehyde into resins that can be molded, probably because a partial re-arrangement occurs (compare British Patent 404,469). Quite differently constituted condensation products are produced in the presence of a sufficient proportion of acid. In this case a re-arrangement of anhydroformaldehydeaniline is intermediately produced, the methylene group being the point of attack in the nucleus. This change occurs very quickly and completely in the presence of an equimolecular proportion of mineral acid, but it can also be produced by organic acids. The condensation products obtained in acid solution with 1 molecular proportion of formaldehyde may be regarded as polymerized anhydro-para-amidobenzylalcohol. This is formulated in the older literature (compare Beilstein II, Ergänzungsband, 646) as an internal anhydride

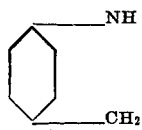

but the later work of Staudinger concerning the chain construction of similar highly polymeric compounds, such as para-formaldehyde or styrol (compare Ber. 53, 1073/1920 and 59, 3019/1926) is in favor of a formula somewhat on the following lines

R—NH—CH$_2$—R—NH—CH$_2$—R—NH—CH$_2$—R in which R is aryl which may be supported by the fact that both this polymeric anhydroaminobenzylalcohol (compare German Patent No. 98,813) and the simple aminobenzylaniline (compare German Patent No. 75,674) are converted by treatment with sulfur into thiazole compounds, which can only be explained if in both cases the grouping R—NH—CH$_2$—R is present.

These products, obtainable in acid solution from equimolecular proportions of aniline and formaldehyde, are amorphous, non-hardening, fusible powders which are not soluble in alcohol and benzene but dissolve in many other solvents of higher boiling points.

Further quantities of aldehyde attack these chains, probably with formation of methylene bridges of the diphenylmethane type (—R—CH$_2$—R—)

and condense them to very stable molecules. These products are insoluble, infusible powders, which can be molded under sufficient pressure at a high temperature to yield mechanical and electrical articles of a high degree of excellency. The single disadvantage of these resins is their low fluidity and their insolubility in the usual solvents.

Apparently the linkage of a large number of molecules by means of methylene bridges of the types —R—NH—CH$_2$—R— and —R—CH$_2$—R— is essential for the production of the unusual mechanical properties of these resins.

In the British Patents 342,325; 342,767; 372,075; 372,076, and 373,358 it is shown that resins of the same type may be made by subsequent treatment of the fusible resins produced in the presence of a large excess of acid with further quantities of aldehyde, and also that infusible resins of this group are still capable of fixing aldehyde without the necessity for the presence of acid.

While, therefore, the resins obtained in acid solution yield with additional quantities of aldehyde resins of characteristic strength and very good stability towards heat, the azomethine resins can be hardened only under certain conditions to the degree requisite for the production of molded bodies. They have, however, the great advantage that they are soluble in solvents of low boiling point and in this form may be used for saturating molding powders, so that a very homogeneous and intimate union of the particles of the mass is attained. By subsequent treatment with aldehydes and if necessary, acids, they may now be so far hardened that the mixture comprising them can be molded. These resins do not compete in their mechanical properties with those made in acid solution, which no doubt is due to the fact that the azomethine groups have been only in part changed into methylene bridges.

For the manufacture of moldable amine resins there are therefore 3 available methods:—

(1) Condensation of primary aromatic amines in acid solution with more than one mol. aldehyde. These resins yield very good, molded articles but are soluble only in chlorhydrins.

(2) Similar condensation with only 1 mol. aldehyde and further treatment of the fusible resin with aldehyde or an agent yielding aldehyde. These resins also yield good molded articles, are of improved fluidity and the fusible parent products and a portion of the intermediate products are soluble in many commercial solvents but not in alcohol or benzene.

(3) Condensation of formaldehyde with primary aromatic bases in equimolecular proportions, without acid or with an insufficiency of acid, subsequent conversion, if necessary, into fusible resin and subsequent hardening by treatment with aldehyde, generally in presence of some acid, at a temperature not too high. The parent materials are more soluble than those produced by Methods 1 and 2 but the solubility is still not ideal and the products obtained stand between the brittle azomethine resins of comparatively low melting point and the tough amine resins produced by Methods 1 and 2.

A resin which hardens well, dissolves in cheap commercial solvents and can be used similarly to the phenol resins for coating, saturating and impregnating molded and unmolded supports would be of commercial advantage if supplied by the amine resins in view of their superior electrical and mechanical properties for the many requirements of industry.

The present invention is based on the observation that it is not the resinous character of a parent material which determines its further hardening, and therewith the production of molded products of good quality, but the presence of methylene bridges in the form which investigation has shown to be particularly favorable, namely chain linkings —R—NH—CH$_2$—R— and —R—CH$_2$—R— in which R is aryl. It has been shown that even amine bases, which are built up of only two nuclei united by such a methylene bond can be hardened to good molding mixtures by further quantities of aldehyde. Still better results are obtained if polynuclear methylene bases constructed on analogous lines which contain less than 2 mols methylene to 2 mols aromatic amine are employed. The hardening is preferably brought about with such large quantities of aldehyde that the total aldehyde amounts to 1.2–1.5 mols or greater for one mol. of the aryl nucleus, which molding mixtures approximate the resins obtainable in acid solution and surpass the resins made from azomethine derivatives. It may be noted that in some nuclei of these bases the amino-group can be exchanged for the hydroxy-group, as for instance in hydroxybenzylaniline.

Of the bases coming into consideration as parent materials and falling within the aforesaid groups may be named aminobenzylaniline and its higher molecular homologues and analogues, as described for instance in the Patent No. 1,999,069; the para-diaminodiphenylmethane and its derivatives; also the hydroxybenzylarylamines which can be obtained by condensation of mono- and poly-methylolphenols with primary aromatic bases or of Schiff's bases with phenols may be used. One may also start from the derivatives which are produced by substituting for formaldehyde other aldehydes, like furfural, acrolein, croton aldehyde or the like, in the above synthesis. In the latter case substituted methylene compounds of aromatic bases are obtained, viz. polynuclear bases the nuclei of which are linked together with substituted methylene-groups. The bases need not be built up from aldehydes and amines or phenols. The aminobenzylaniline, which is obtained from the nitrobenzylchloride and aniline and subsequent reduction, is applicable in like manner. All these bases always contain less than 2 mols methylene, or substituted methylene, for 2 aromatic nuclei. The said compounds need not be isolated in the pure condition but can with advantage be used in the form of the mixtures produced during their production. So also, and obviously, the bases may be isolated from such mixtures for use.

The more the content of aldehyde approaches the equimolecular proportion, the more pronounced will be the resinous character of the compounds produced, while the binuclear compounds are generally of an oily nature. Proportions above about 0.85 mol. methylene for each amine residue appear to decrease the solubility and to approximate the whole behavior to that of the fusible equimolecular amine resins obtained under acid conditions.

The new compounds are soluble in the commonly used solvents, particularly in mixtures of solvents. They form salts with mineral acids and may be further condensed under very varied conditions with further quantities of aldehyde or agents yielding aldehyde, such as formaldehyde, furfural, polymethylol-phenols, acrolein, etc. In this way one may either produce directly infusible, insoluble resins or may obtain intermediate compounds which are capable of being hardened and are still soluble, and convert them at a raised temperature, with or without pressure, into insoluble and infusible products. In acid solution the bases may be condensed with formaldehyde, just as aniline is, to produce resins which are fundamentally similar to those forming the subject matter of the British Patents 342,325; 342,767; 372,075; 372,076, and 373,358, so that their character as the first step towards these resins may be recognized. Much more important, however, is their capacity to condense with aldehydes directly to very serviceable hardened products. The bases when hardened in presence of acid catalysts, such as inorganic or organic, mono- or polybasic acids or acid salts or in many cases even without an acid catalyst yields very valuable insoluble and infusible resins. They furnish molded articles which are essentially more stable towards heat and mechanically better than can be obtained from the amines not containing methylene and from azomethine resins under like conditions. It is even possible to condense different aldehydes in stages whereby the properties can be much varied.

The new process is particularly suitable for making very homogeneous amine resin molding powders possessing good flowing ability by impregnation of filling materials, such as wood-meal, asbestos powder, and the like, the impregnation with the resin taking place while it is hot and hence very fluid, or by means of a concentrated solution of the resin. The impregnated material is then treated with aldehyde. The molding period may be much diminished by pre-hardening at a mild temperature. In many cases the parent base may be produced in presence of the filling agent, whereby a still more intimate saturation of the filling material with the resin is secured. It is often possible to obtain soluble compounds of the parent bases with aldehyde with which supports, such as textile and paper webs, can be painted, and which, without further hardening agent, may be hardened by pressure under raised temperature.

The speed of hardening may be profoundly influenced by an added catalyst of acid or basic nature according to the character of the resin.

The following examples illustrate the invention, the parts being by weight:—

Example 1

100 parts of aminobenzylaniline are mixed with 100 parts of furfural and the thin solution thus obtained is mixed with 200 parts of wood-meal in a Werner Pfleiderer mixer. The homogeneous mass is then heated in a closed vessel for 15 hours at 50° C. and for 4 hours at 110° C. and is then dried in a vacuum. By grinding the product, advantageously with 2 parts of stearic acid, there is obtained an almost black molding powder which by compression at 160° C. is capable of being transformed into homogeneous molded articles of very good resistance to heat.

Example 2

Into 279 parts of aniline (3 mols) are introduced rapidly at 60° C. 123 parts of formaldehyde of 40 per cent. strength (1½ mols). The mixture becomes heated to 70° C. and the water formed in the reaction separates and is removed by means of a separating funnel. The anhydroformaldehydeaniline thus formed remains dissolved and separates only on long standing. It is therefore advantageous to work up the solution directly. With vigorous stirring 5 parts of concentrated hydrochloric acid are added to the solution, whereupon there is at once a considerable evolution of heat and the temperature is kept at 70° C. by energetic cooling. There are now introduced at 70–90° C., 52 parts of anhydroformaldehydeaniline, which for the purpose of improving the tendency for being wetted, should be rubbed with a little alcohol. A clear solution is produced. After 1 hour the acid is neutralized with 50 parts of N-sodium carbonate solution and the excess of aniline is steam distilled. There remains a thick yellow oil which becomes solid on cooling, without crystallization. The molecular proportion of methylene to aniline is 0.73:1. There is here, therefore, mainly a chain of 4 aniline residues united by 3 methylene groups.

140 parts of this base are dissolved in 100 parts of a mixture of benzene and alcohol and the solution is kneaded with 140 parts of wood-meal. There are then introduced, while continuously mixing, 3 parts of stearic acid and 70 parts of formaldehyde of 40 per cent. strength and the whole is heated for one hour in a closed mixing vessel. The mixture is subjected to a further heat treatment at 60° C. for 16 hours, dried in a vacuum and ground. By compression at 155° C. there are obtained homogeneous compressed articles of good mechanical and electrical properties.

Example 3

160 parts of ortho-toluidine (1½ mols) are dissolved in 80 parts of glacial acetic acid and 160 parts (1½ mols) of anhydroformaldehydeaniline, rubbed up with alcohol are introduced cold. Dissolution is accelerated by the addition of 50 more parts of glacial acetic acid. The whole is allowed to stand over-night, neutralized with sodium carbonate and distilled in steam to remove the excess of toluidine. The residue is a brownish, thick mass which becomes a thin fluid when heated and contains 0.78 mol. methylene to 1 mol. base and therefore may be considered as built up from 3 mols aniline, 1 mol. toluidine and 3 methylene bridges.

130 parts of this base are dissolved in 100 parts of a mixture of benzene and alcohol and the solution is mixed with 130 parts of wood-meal. While continuously kneading 60 parts of formaldehyde of 40 per cent. strength and 3 parts of glacial acetic acid are added and the thoroughly kneaded mass is heated for 2 hours at 50° C. Drying in a vacuum follows and the product is ground with 25 parts of furfural and 3 parts of zinc stearate to a powder which is hardened for 10 hours at 60° C. The dark powder may be worked up at 160° C. to homogeneous, almost black molded articles.

Example 4

100 parts of para-nitrobenzylaniline are dissolved in 600 parts of alcohol, the solution is mixed with 30 parts of calcium chloride and boiled in a reflux apparatus. There are introduced in small portions 200 parts of zinc dust and the mass is boiled until completely colorless and then filtered hot. For the purpose of separating the calcium chloride, the filtrate is stirred for about an hour with 30 parts of sodium carbonate and a little water and thereafter filtered. After distilling the alcohol, the aminobenzylaniline remains in the form of a somewhat dark-colored, thick oil.

49.5 parts of this base (¼ mol.) are brought into solution with 1000 parts of hydrochloric acid of 2 per cent. strength. The solution is filtered and, while strongly stirring at 30° C., is mixed with 30 parts (0.37 mol.) of formaldehyde of 40 per cent. strength. The temperature rises to 40° C. and is maintained at this temperature for about 20 minutes, whereupon the mass is neutralized by means of caustic soda solution, filtered and the solid matter washed. The voluminous, infusible powder thus obtained may be compressed at 145° C. to clear, molded articles of very good mechanical and electrical properties.

Example 5

100 parts of the base obtainable as described in Example 2 are dissolved in 300 parts of alcohol and 100 parts of glacial acetic acid and 250 parts of formaldehyde of 40 per cent. strength are quickly added at 50° C., while stirring well. The precipitate at first formed soon changes into a soft resin and after 15 minutes the resin is precipitated as completely as possible by addition of water, then separated from the liquid and dissolved in a mixture of benzene and alcohol. With this solution a web of woven fabric is saturated and then heated for 15 hours at 60° C. to harden the resin. After drying, the material may be cut into suitable pieces which are then piled and compressed. Homogeneous compressed bodies of very good properties are thus obtained.

Example 6

650 parts of aniline hydrochloride (5 mols) are dissolved in 2000 parts of water and at 40° C. there are quickly added 328 parts (4 mols) of formaldehyde of 40 per cent. strength. The temperature rises to about 60° C. The whole is now warmed to 80° C. and kept at this temperature for about an hour, whereupon it is neutralized with sodium carbonate and the small quantity of aniline which is present is distilled in steam. The residue is resinous but oily when heated. It constitutes a good yield and is very similar to the base obtained as described in Example 2.

200 parts of this resin are dissolved in 400 parts of a mixture of alcohol and benzene and the solution is mixed with 30 parts of glacial acetic acid and 100 parts of croton aldehyde while cooling. There ensues a brisk reaction, with the separation of a red resin. Heating is continued for some hours in a reflux apparatus at 60–80° C. After expulsion of the solvent the resin is rubbed up with sodium carbonate solution, washed, dried and ground. It flows well and may be hardened by pressure to dark, insoluble and infusible molded articles of good properties.

Example 7

150 parts of the thick oily base obtained as described in Example 2 are dissolved in 100 parts of a mixture of alcohol and benzene. The solution is mixed with 5 parts of glacial acetic acid and then kneaded with 150 parts of wood-meal. After ¼ hour 50 parts of acrolein are added with continuous and thorough incorporation and the mixture is further mixed in a closed apparatus for some hours at 50 C. After drying in a vacuum the product is ground with 8 parts of para-form-aldehyde and 3 parts of salicylic acid. The molding powder thus obtained flows well, hardens quickly in the press at 150° C. and yields very homogeneous, molded articles of good properties.

Example 8

100 parts of diaminodiphenylamine are dissolved in 1000 parts of water and 150 parts of concentrated hydrochloric acid at 40° C. 112 parts of formaldehyde of 40 per cent. strength are added, while stirring well. By heating to 50° C. there is soon precipitated a soft, gelatinous resin. The whole is kept for ½ hour at 50 to 60° C. and then neutralized by means of caustic soda solution and the infusible, insoluble powder thus obtained is washed. At 185–190° C. it can be compressed to tough, molded articles of very good mechanical and thermal properties.

Example 9

198 parts of diaminodiphenylmethane (1 mol.) are dissolved in 600 parts of alcohol and, while stirring, 164 parts of formaldehyde of 40 per cent. strength (2 mols) are added. The whole is heated for ½ hour on the water-bath, cooled, filtered and the solid matter dried. The product is the analogue of anhydroformaldehydeaniline. 100 parts of this product are rubbed up with 250 parts of aniline and 120 parts of glacial acetic acid, whereby a thick yellow solution is formed, which, after several hours standing, is neutralized with soda ash and freed from aniline by evaporation. There are obtained 165 parts of a thick oil which probably corresponds with the formula:

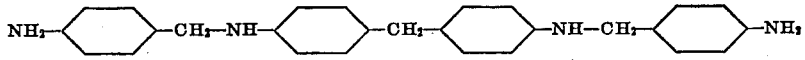

This new base is dissolved in benzene, the solution is mixed with 5 parts of salicylic acid, kneaded with 170 parts of wood-meal and finally mixed with 140 parts of formaldehyde. After thorough intermixture, the mass is heated for 20 hours in a closed vessel at 60° C. and then dried in a vacuum. The molding powder shows good fluidity and the molded articles, made in the usual manner, show good mechanical and electrical properties.

Example 10

108 parts of meta-phenylenediamine (1 mol.) are mixed with 100 parts of alcohol and 114 parts of benzylchloride (0.9 mol.) and the mixture is boiled for 10 hours in a reflux apparatus. The mass is made alkaline with sodium carbonate solution and shaken with benzene. The monobenzylphenylenediamine is thus obtained in the form of a dark oil. 100 parts of it are dissolved in 100 parts of alcohol and benzene mixture, the solution is mixed with 3 parts of glacial acetic acid and then further intimately mixed with 100 parts of wood-meal. Then 60 parts of formaldehyde of 40 per cent. strength are introduced into the mixing machine and kneading is continued for 5 hours in the closed mixer at 50° C. After drying in a vacuum, grinding and compressing in the usual manner, there are obtained homogeneous molded articles of good properties.

Example 11

133 parts of furfural color base, made by condensing 93 parts (1 mol.) of aniline and 48 parts (½ mol.) of furfural in presence of 1 part of acetic acid, and having the probable formula

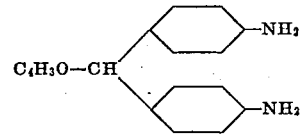

that is to say a quantity corresponding with ½ mol., are dissolved in 130 parts of a mixture of benzene and alcohol and the solution is kneaded with 230 parts of wood-meal. There is then added a solution of 5 parts of phthalic acid in 100 parts of furfural (somewhat more than 1 mol.) and the mixing is continued until the filling material is homogeneously saturated. The mass is then hardened, preferably in a closed vessel, by heating it for 20 hours at 60° C. and 6 hours at 80° C.; it is finally dried in a vacuum. When ground it is a black powder which flows well at 165° C. and can be compressed at this temperature to form lustrous black articles very stable to heat.

Example 12

93 parts of aniline (1 mol.) are dissolved in 100 parts of alcohol and, while cooling with ice, 56 parts of acrolein (1 mol.) are added. The components react with development of a red color and evolution of much heat. Heating in a reflux apparatus is continued for 2 hours until the reaction is complete, by which time the solution has become turbid with separation of a thick oil. This anhydro-product from aniline and acrolein formed in the first phase and which behaves towards amines like anhydroformaldehydeaniline, is now caused to react with aniline by adding to the solution 93 parts of aniline and introducing at 60° C. 20 parts of concentrated hydrochloric acid. The temperature rises to 90° C. After 1 hour the mass is neutralized with sodium carbonate, alcohol and aniline are steam-distilled and the residual resin washed and dried. The composition may be suppposed to correspond with the formula

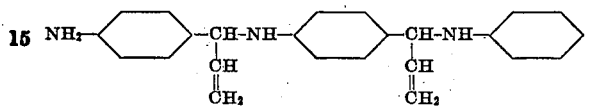

100 parts of this base are dissolved in the mixture of alcohol and benzene and the solution is mixed with 100 parts of wood-meal; then 82 parts of formaldehyde of 40 per cent. strength and 3 parts of salicylic acid are added and the whole thoroughly kneaded. After heat-treatment at 60° C. in a closed vessel for 24 hours, the mass is dried and washed. At 165° C. the powder can be compressed to produce molded articles which are very good.

*Example 13*

94 parts of phenol (1 mol.) are dissolved in the necessary quantity of strong caustic soda solution and the solution is mixed in the cold with 85 parts of formaldehyde of 40 per cent. strength (somewhat more than 1 mol.). After standing for several days at room temperature, the solution contains mainly a mixture of ortho- and para-hydroxybenzyl-alcohol. It is now neutralized cautiously with the theoretical proportion of acetic acid and stirred three times, with 60 parts of aniline on each occasion, whereby the hydroxybenzylalcohol is nearly quantitatively dissolved in the aniline. This solution is mixed with a few drops of glacial acetic acid and heated quickly to boiling. Water is eliminated, the alcohol condensing with aniline to a mixture of ortho- and para-hydroxybenzylaniline.

By steam-distilling the carefully neutralized aniline solution there is obtained the mixture of isomeric benzylanilines in the form of a dark oil. 150 parts of this base are dissolved in 100 parts of a mixture of alcohol and benzene and the solution is thoroughly mixed with 150 parts of wood-meal, whereupon 80 parts of formaldehyde of 40 per cent. strength and 5 parts of glacial acetic acid are added and the whole is kneaded for 1 hour. After hardening for several hours at 60° C. the mass is dried and ground with 3 parts of zinc stearate. By compression at 165° C. there are obtained molded articles of excellent properties. By addition of a small proportion of lime the molding operation can be shortened.

*Example 14*

108 parts of crude cresol (1 mol.) are dissolved in the necessary quantity of strong caustic soda solution and, while cooling well, the solution is poured into 180 parts of formaldehyde of 40 per cent. strength (2.2 mols). The mixture is allowed to stand for some days at room temperature, cautiously neutralized, while cooling with ice, by the addition of cold hydrochloric acid, and a small addition of sodium carbonate is made to ensure the exclusion of acid reaction. By saturating the solution with common salt the greater part of the polymethylol-cresols is separated in the form of a thick syrup, which is removed. The aqueous liquor is thoroughly stirred with 93 parts of aniline (1 mol.), whereby the residue of the water-soluble condensation product is taken up by the aniline. The aniline extract is now combined with the portion of the polymethylene-cresols, removed as aforesaid, and 5 parts of glacial acetic acid are added and the whole heated for a long time at 60° C. and then at 100° C. The oil, which at first is a thin liquid, quickly thickens and finally becomes a hard, tough resin. It is supposed that in a first step one methylol group of the cresol-polymethylol compound reacts with the aniline with formation of a binuclear methylene base, which undergoes an intramolecular condensation under partial hardening by the methylol groups in excess. This reaction may occur directly or by partial splitting off of formaldehyde, which reacts in a second step on the methylene base. The final hardening at elevated temperatures, with or without pressure, yields at about 165° C. an infusible, insoluble molded article of very good properties. By addition of furfural, paraformaldehyde, hexamethylenetetramine or other aldehyde or substance yielding aldehyde, the hardening is improved and accelerated. The resin may be obtained directly in the presence of a filling agent; for instance wood-meal may be saturated with the calculated quantity of aniline and then kneaded with polymethylolcresol and some glacial acetic acid. After suitable hardening, if desired in the presence of a further quantity of an aldehyde, molding powders are obtained by grinding, which can be compressed to excellent molded articles.

*Example 15*

A solution of polymethylolphenol, obtained in the manner described in Example 13 from 94 parts of phenol (1 mol.) and 164 parts of formaldehyde of 40 per cent. strength (2 mols) is mixed with a solution of 260 parts of aniline hydrochloride (2 mols) in 600 parts of water and 200 parts of concentrated hydrochloric acid. The mixture is heated for about 1 hour to 60° C. for bringing about the condensation, the completion of which is indicated by the turbidity of the solution. The condensation product may be precipitated by means of sodium carbonate in the form of a soft resin soluble in a mixture of alcohol and benzene and capable of being hardened by the addition of further quantities of aldehyde. If one refrains from precipitating the condensation product and adds to the acid condensation solution 140 parts of formaldehyde of 40 per cent. strength, there is soon produced a red precipitate which on neutralization with sodium carbonate becomes a yellow powder. This is washed and dried and passes with very good flow in the press at 160° C. into opaque, infusible molded pieces.

*Example 16*

100 parts of the base obtained according to Example 2 are dissolved in 100 parts of a mixture of alcohol and benzene and the solution is kneaded with 200 parts of wood-meal. There are then added to the mass 100 parts of polymethylolcresol, obtained and isolated as described in Example 13, dissolved in 100 parts of alcohol, and kneading is continued for 2 hours. The mass thickens rapidly and is preliminarily hardened for about 24 hours at 60° C. and then heated for some hours at 90° C. Finally it is dried and ground. The molding powder has good fluidity and hardens under pressure rapidly to valuable pressed forms. The hardening occurs in this case during the elimination of formaldehyde from the polymethylolcresol.

What I claim is:—

1. Process of manufacturing moldable synthetic resins, which comprises reacting a polynuclear aromatic amine base, the nuclei of which are linked together by less than 2 mols of methylene-groups for each 2 mols of aromatic radicle and which contains at least as many amine groups as linked nuclei, with an aldehydic substance.

2. Process of manufacturing moldable synthetic resins, which comprises reacting a polynuclear aromatic amine base containing hydroxy groups, the nuclei of which are linked together by less than 2 mols of methylene-groups for each 2 mols of aromatic radicle and which contains at least as many amine and hydroxy groups as linked nuclei, with an aldehydic substance.

3. Process of manufacturing moldable synthetic resins, which comprises reacting a polynuclear aromatic amine base, the nuclei of which are linked together by less than 2 mols of unsubstituted methylene-groups for each 2 mols of aromatic radicle and which contains at least as many amine groups as linked nuclei, with an aldehydic substance.

4. Process of manufacturing moldable synthetic resins, which comprises reacting a polynuclear aromatic amine base, the nuclei of which are linked together by less than 2 mols of substituted methylene-groups, corresponding to an aldehyde selected from the group consisting of furfural, acrolein and crotonaldehyde, for each 2 mols of aromatic radicle and which contains at least as many amine groups as linked nuclei, with an aldehydic substance.

5. Process of manufacturing moldable synthetic resins, which comprises reacting a polynuclear aromatic amine base, the nuclei of which are linked together by less than 2 mols of methylene-groups for each 2 mols of aromatic radicle and which contains at least as many amine groups as linked nuclei, with an aldehydic substance at a moderate temperature.

6. Process of manufacturing molded synthetic resins, which comprises reacting a polynuclear aromatic amine base, the nuclei of which are linked together by less than 2 mols of methylene-groups for each 2 mols of aromatic radicle and which contains at least as many amine groups as linked nuclei, with an aldehydic substance and thereafter hardening the reaction product at elevated temperature.

7. Process of manufacturing molded synthetic resins, which comprises reacting a polynuclear aromatic amine base, the nuclei of which are linked together by less than 2 mols of methylene-groups for each 2 mols of aromatic radicle and which contains at least as many amine groups as linked nuclei, with an aldehydic substance and thereafter molding the reaction product at elevated temperature and pressure.

8. Process of manufacturing molded synthetic resins, which comprises reacting a polynuclear aromatic amine base containing hydroxy groups, the nuclei of which are linked together by less than 2 mols of methylene-groups for each 2 mols of aromatic radicle and which contains at least as many amine and hydroxy groups as linked nuclei, with an aldehydic substance and thereafter molding the reaction product at elevated temperature and pressure.

9. Process of manufacturing moldable synthetic resins, which comprises reacting a polynuclear aromatic amine base, the nuclei of which are linked together by less than 2 mols of methylene-groups for each 2 mols of aromatic radicle and which contains at least as many amine groups as linked nuclei, with a formaldehyde yielding substance.

10. Process of manufacturing moldable synthetic resins, which comprises reacting a polynuclear aromatic amine base, the nuclei of which are linked together by less than 2 mols of methylene-groups for each 2 mols of aromatic radicle and which contains at least as many amine groups as linked nuclei, with furfural.

THEODOR SUTTER.